(12) United States Patent
Guo et al.

(10) Patent No.: US 9,401,166 B2
(45) Date of Patent: Jul. 26, 2016

(54) METHODS AND APPARATUS FOR IMPROVED PATTERN DETECTION

(71) Applicant: Avago Technologies General IP (Singapore) Pte. Ltd., Singapore (SG)

(72) Inventors: Linjiang Guo, Shanghai (CN); Zhi Bin Li, Shanghai (CN); Yao Zhao, Shanghai (CN); Dahua Qin, Allentown, PA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/924,648

(22) Filed: Oct. 27, 2015

(65) Prior Publication Data

US 2016/0049168 A1    Feb. 18, 2016

Related U.S. Application Data

(63) Continuation of application No. 14/323,286, filed on Jul. 3, 2014, now abandoned.

(30) Foreign Application Priority Data

Jul. 9, 2013    (CN) .......................... 2013 1 0284484

(51) Int. Cl.
*G11B 5/09* (2006.01)
*G11B 5/596* (2006.01)

(52) U.S. Cl.
CPC ........ *G11B 5/59627* (2013.01); *G11B 5/59688* (2013.01)

(58) Field of Classification Search
None
See application file for complete search history.

(56) References Cited

U.S. PATENT DOCUMENTS

| 6,671,404 | B1 * | 12/2003 | Kawatani et al. ............. 382/190 |
| 7,499,233 | B1 * | 3/2009 | Han et al. ......................... 360/65 |
| 8,749,908 | B2 * | 6/2014 | Xia et al. ......................... 360/51 |
| 8,837,263 | B1 * | 9/2014 | Cao et al. ................... 369/47.28 |
| 9,001,445 | B1 * | 4/2015 | Cao et al. ......................... 360/39 |
| 2007/0234188 | A1 * | 10/2007 | Shiraishi ....................... 714/794 |
| 2011/0157737 | A1 * | 6/2011 | Grundvig et al. ............... 360/49 |
| 2011/0209026 | A1 * | 8/2011 | Xia et al. ....................... 714/752 |
| 2012/0106607 | A1 * | 5/2012 | Miladinovic et al. ......... 375/224 |
| 2012/0281305 | A1 * | 11/2012 | Xia et al. ......................... 360/32 |
| 2014/0139939 | A1 * | 5/2014 | Qin et al. ......................... 360/32 |
| 2014/0286149 | A1 * | 9/2014 | Cao et al. ................... 369/47.28 |
| 2014/0331108 | A1 * | 11/2014 | Qin et al. ....................... 714/799 |

\* cited by examiner

*Primary Examiner* — Thang Tran

(57) ABSTRACT

Improved pattern detection is provided for a predefined pattern in data. A detection threshold employed by a Euclidean detector to detect a pattern (such as a Servo Address Mark) may be adjusted based upon data gathered that corresponds to an indication of a detected pattern by one of a plurality of pattern detectors.

22 Claims, 3 Drawing Sheets

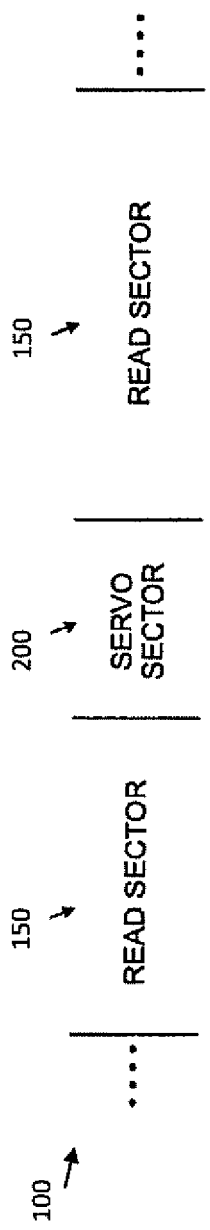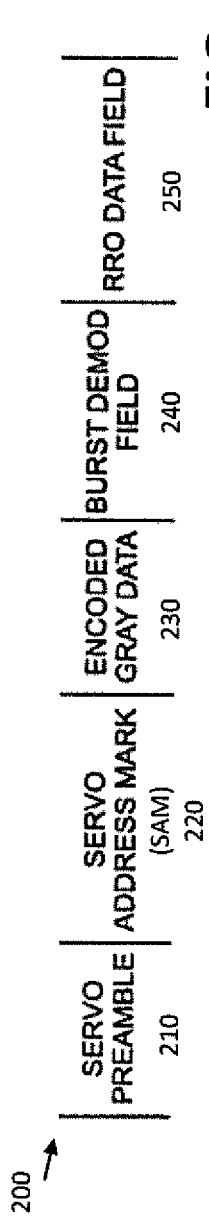

//<br>
METHODS AND APPARATUS FOR IMPROVED PATTERN DETECTION

CROSS-REFERENCE TO RELATED APPLICATIONS

This application is a continuation of U.S. patent application Ser. No. 14/323,286 entitled Methods and Apparatus for Improved Threshold Adaptation for a Euclidean Detector" filed Jul. 3, 2014; which claims the benefit of Chinese Patent Application No. 201310284484.2, filed Jul. 9, 2013. The entirety of both of the aforementioned applications is incorporated herein by reference.

BACKGROUND

In a magnetic recording system, the tracks on a magnetic recording disk comprise "read" sectors with "servo" sectors embedded between the read sectors. The servo sector typically begins with a known preamble pattern, followed by a Servo Address Mark (SAM) and various servo data. The Servo Address Mark is used to position a magnetic recording head over the magnetic recording disk so that the user information stored in the read sectors can be retrieved properly. The Servo Address Mark is typically detected using a Hamming detector or a Euclidean detector. Hamming detectors analyze a Hamming distance metric to detect the Servo Address Mark while Euclidean detectors analyze a Euclidean distance to detect the Servo Address Mark.

A Euclidean detector is generally considered to offer better performance than a Hamming detector due to a detection threshold Dthr that is adapted to obtain an optimum value. The adaptation of the detection threshold Dthr, however, requires that the Servo Address Mark is found. If the detection threshold Dthr is set improperly so that the Servo Address Mark is not found, then the adaptation will never converge.

A need therefore exists for improved techniques for adapting the detection threshold Dthr in Euclidean SAM detectors.

SUMMARY

Illustrative embodiments of the invention provide methods and apparatus for improved threshold adaptation for Euclidean detection of a predefined pattern in data. According to one embodiment of the invention, a detection threshold employed by a Euclidean 30 detector to detect a pattern in data is adapted by determining a minimum Euclidean distance metric Dp before the pattern is declared in a given portion of the data; determining a Euclidean distance metric $D_s$ at a time when the pattern is found in the given portion, wherein at least one of the patterns is found using a Hamming detector; determining, for a plurality of the portions, a minimum $D_p$ value, $D_{pmin}$, that is a substantial minimum $D_p$ value for the plurality of portions and a maximum $D_s$ value, $D_{smax}$, that is a substantial maximum $D_s$ value for the plurality of portions; and determining the detection threshold based on the minimum $D_p$ value, $D_{pmin}$, and the maximum $D_s$ value, $D_{smax}$.

In one exemplary embodiment, the pattern is detected if the Euclidean distance metric between soft metrics of a received code word and ideal soft metrics of the pattern is less than or equal to the detection threshold. The pattern comprises, for example, a Servo Address Mark (SAM), a Repeatable Run Out data (RRO) Address Mark (RROAM), an image pattern and/or an antenna signal pattern. When the detected pattern comprises a Servo Address Mark (SAM), the portion corresponds to a given servo sector of a disk and the plurality of the portions comprises the disk itself.

According to another aspect of the invention, the detection threshold is based on a configurable margin gain value.

A more complete understanding of embodiments of the present invention will be obtained by reference to the following detailed description and drawings.

BRIEF DESCRIPTION OF THE DRAWINGS

FIG. 1 illustrates a typical track format for recording servo sector information and read sector information on a magnetic medium;

FIG. 2, illustrates a format for the servo sectors of FIG. 1;

DETAILED DESCRIPTION

Figure 3:
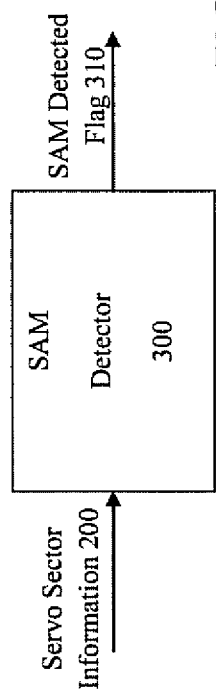
FIG. 3 is a block diagram illustrating a conventional SAM detector.

Embodiments of the invention will be illustrated herein in conjunction with exemplary magnetic recording devices, controllers and associated read channel techniques. It should be understood, however, that this and other embodiments of the invention are more generally applicable to any magnetic recording system in which improved Servo Address Mark detection is desired, and may be implemented using components other than those specifically shown and described in conjunction with any embodiments of the invention.

Exemplary embodiments of the invention provide techniques for threshold adaptation for a Euclidean detector in a magnetic recording system. According to one aspect of the invention, a Hamming SAM detector is employed (for example, in parallel with the Euclidean SAM detector) to assist with the adaptation of the detection threshold of the Euclidean detector. According to a further aspect of the invention, the margin gain for the detection threshold can be varied in different application scenarios.

While the present invention is illustrated herein in the context of detecting Servo Address Mark patterns, the present invention may be more broadly applied to the detection of any pattern by a Euclidean detector where the adaptation of the detection threshold depends on the detection of the pattern itself, such as the detection of a Repeatable Run Out data (RRO) Address Mark (RROAM), as well as in image detection and antenna detection, as would be apparent to a person of ordinary skill in the art.

FIG. 1 illustrates a typical track format 100 for recording servo sector information 200, as discussed further below in conjunction with FIG. 2, and read sector information 150 in a disk drive. In an embedded servo system, for example, there are typically approximately 60 to 100 servo sectors 200 per track that consume about 10% of the surface area. The remaining 90% of the surface area is used for read sectors 150 to store user data information. As shown in FIG. 1, the servo sectors 200 and read sectors 150 typically alternate on a given track, such that each servo sector 200 is typically preceded by a read sector 150 and followed by a read sector 150.

FIG. 2 illustrates a format of servo sector information 200 that incorporates embodiments of the present invention. As shown in FIG. 2, the servo sector information 200 comprises a preamble 210, such as a 2T preamble pattern, that allows the recording system to recover the timing and gain of the written servo data. The preamble 210 is typically followed by a servo address mark (SAM) 220 that is generally the same for all servo sectors and may then be followed by encoded Gray data 230. The Gray data 230 is followed by one or more burst demodulation fields 240. The burst demodulation fields 240 are followed by an RRO data field 250. The SAM 220 comprises some fixed number of bits. The Gray data 230 represents the track number/cylinder information and serves as a coarse positioning for the magnetic recording head. The burst demodulation field(s) 240 serves as a fine positioning system for the head to be on track. The RRO data field 250 provides head positioning information that is finer than that provided by the Gray data 230 and more coarse than that provided by the burst demodulation field(s) 240.

FIG. 3 is a block diagram illustrating a conventional SAM detector 300. As shown in FIG. 3, the SAM detector 300 processes the servo sector information 200 and generates a SAM detected flag 310 when the SAM is detected. As previously indicated, the SAM detector 300 is typically embodied as a Hamming detector or a Euclidean detector, each discussed hereinafter.

Hamming SAM Detector

The Hamming distance between two code words of equal length is the number of positions at which the corresponding symbols are different. For example, the Hamming distance between the code word "000101001" and the code word "100101001" is 1, because the corresponding symbols are different at one position. The Hamming detector declares a SAM once the distance between the received code word and the SAM pattern is less than or equal to a predefined tolerance. For example, if the SAM pattern is "000101001," the received code word is "100101001" and the predefined tolerance is 1, the SAM will be declared by the Hamming SAM detector. The received code word for a Hamming SAM detector can be obtain from a hard decision decoder or a soft decision decoder, such as a Viterbi decoder that processes received soft-metric samples, in a known manner.

Euclidean SAM Detector

The Euclidean distance between two points in N-dimension, $(p_1, p_2, \ldots, p_n)$ and $(q_1, q_2, \ldots, q_n)$, can be expressed as follows:

$$d(p, q) = \sqrt{\sum_{i=1}^{N}(q_i - p_i)^2} \quad (1)$$

For example, the Euclidean distance, $d(p, q)$, between the soft metrics (20, −20, 20) and the soft metrics (21, −19, 19) can be expressed as follows:

$$\sqrt{(21-20)^2 + (-19+20)^2 + (19-20)^2} = \sqrt{3}.$$

A hardware implementation typically calculates the square, $d^2(p, q)$, of the Euclidean distance, $d(p, q)$, to avoid the square root operation. The metric of the square of the Euclidean distance is marked as $D(p, q)$. Thus, the Euclidean distance can also be expressed as follows:

$$D(p, q) = d^2(p, q) = \sum_{i=1}^{N}(q_i - p_i)^2 \quad (2)$$

The Euclidean detector declares a SAM once the Euclidean distance $D(p, q)$ between the soft metrics of the received code word and the ideal soft metrics of the SAM pattern is less than or equal to a predefined threshold. Thus, the SAM can be declared found if the following expression is satisfied:

$$D(p,q) \leq D_{thr},$$

where p comprises metrics for the ideal SAM pattern, q comprises metrics for the received code word and the detection threshold is $D_{thr}$.

For example, if the ideal soft metrics, p, of an ideal SAM pattern are (20, −20, 20) and the soft metrics, q, of the received code word are (21, −19, 19) and the threshold, $D_{thr}$, is 4, then the SAM will be declared by the Euclidean SAM detector. The Euclidean SAM detector is a detector with soft-metric decoding that provides the p and q metrics.

During a detection threshold adaptation for each servo sector on a disk, $D_s$ is Euclidean SAM distance Square metric from Equation (2) at the time SAM is found in a given servo sector of the disk. Likewise, $D_p$ is the minimum Euclidean distance Square metric from Equation (2) before SAM is declared in a given servo sector of the disk. Thus, $D_s$ and $D_p$ are obtained and recorded for each disk servo sector.

An exemplary optimized threshold, $D_{thr}$, for a given disk zone can be expressed by the following equation:

$$D_{thr} = D_{smax} + \frac{1}{2} \times (D_{pmin} - D_{smax}) \quad (3)$$

where $D_{pmin}$ is the minimum $D_p$ value for all of the servo sectors on a disk and $D_{smax}$ is the maximum $D_s$ value for all of the servo sectors on a disk. In a given disk zone, all servo sectors are the same, having the same data format, Channel Bit Density, etc. As used herein, a substantial minimum or a substantial maximum shall include, for example, any value within the Bottom N or Top N values, respectively, where N is a small number.

The detection threshold $D_{thr}$ is important for Euclidean detectors and it can vary in different disk zones. The detection threshold $D_{thr}$ is adapted to get an optimum value. As indicated above, however, the adaptation requires that the SAM is found. In other words, if the detection threshold $D_{thr}$ is set improperly so that SAM is not found, then the adaptation will not converge. In addition, the threshold margin gain, ½, of equation (3) is not optimum for all application scenarios.

According to one aspect of the invention, a Hamming SAM detector is employed in parallel with the Euclidean SAM detector to assist with the adaptation of the detection threshold of the Euclidean SAM detector.

Figure 4:
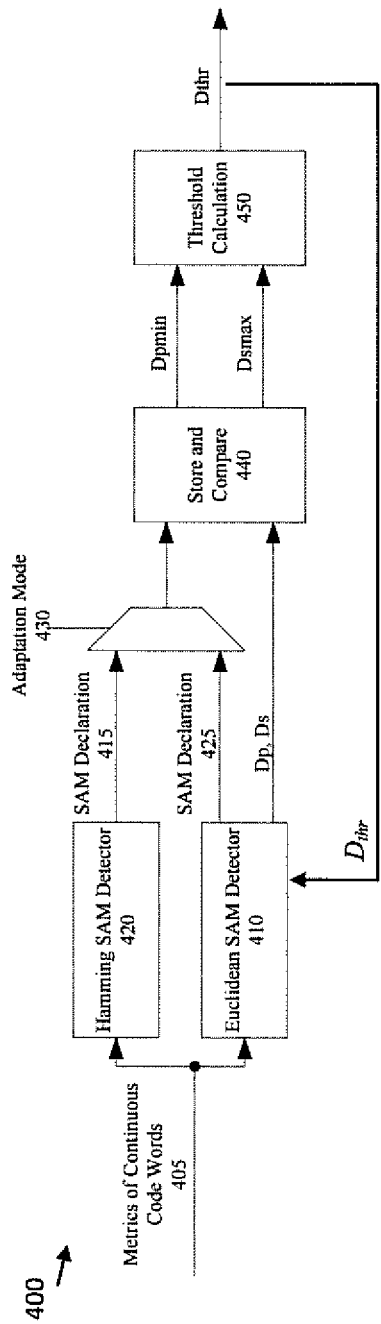
FIG. 4 is a block diagram of a detection threshold adapter 400 for a Euclidean SAM detector incorporating aspects of the invention.

FIG. 4 is a block diagram of a detection threshold adapter 400 for a Euclidean SAM detector 410. As shown in FIG. 4, the detection threshold adapter 400 comprises a Euclidean SAM detector 410 and a Hamming SAM detector 420 that operate in parallel. The Euclidean SAM detector 410 and the Hamming SAM detector 420 operate in a similar manner to the SAM detectors discussed above in conjunction with FIG. 2 to generate a SAM declaration 425, 415, respectively. As noted above, the Hamming SAM detector 420 can be a hard decision decoder or a soft decision decoder such as a Viterbi detector and the Euclidean SAM detector 410 is a soft decision decoder such as a Viterbi detector.

As shown in FIG. 4, the Euclidean SAM detector 410 generates the $D_s$ and $D_p$ values for each disk servo sector, in the manner described above. The $D_s$ and $D_p$ values are provided to a store-and-compare block 440 that stores the $D_s$ and $D_p$ values for each disk servo sector. In addition, the store-and-compare block 440 stores the minimum $D_p$ value for all of the servo sectors on a disk before declaring that the SAM is found as $D_{pmin}$ and the maximum $D_s$ value for all of the servo sectors on a disk declaring that the SAM is found as $D_{smax}$.

An adaptation mode signal 430 optionally controls whether the store-and-compare block 440 employs the Hamming SAM detection result 415 from the Hamming SAM detector 420 or the Euclidean SAM detection result 425 from the Euclidean SAM detector 410 for the adaptation. In one exemplary implementation, the Hamming SAM detector 420 is used to initially obtain a coarse detection threshold $D_{thr}$, and then the Euclidean SAM detector 410 is used to fine tune the detection threshold $D_{thr}$.

The store-and-compare block 440 provides the $D_{pmin}$ and $D_{smax}$ values to a threshold calculation block 450 that computes the detection threshold according to equation (4), below. The computed detection threshold is then fed back to the Euclidean SAM detector 410.

According to a further aspect of the invention, the threshold margin gain, $g_m$, is optionally configurable. In this manner, the margin gain, $g_m$, for the detection threshold can be varied for different applications. The margin gain, $g_m$, determines how much the adapted threshold is deviated from the average of $D_{smax}$ and $D_{pmin}$. Thus, the threshold adaptation equation can be expressed as follows:

$$D_{thr}=D_{smax}+g_m\times(D_{pmin}-D_{smax}) \quad (4)$$

where the margin gain, $g_m$, is a configurable value between 0 and 1.

In one exemplary implementation, to simplify the hardware implementation, the margin gain, $g_m$, can cover the options of $$\frac{1}{8}, \frac{1}{4}, \frac{1}{2} \text{ and } \frac{3}{4}.$$

As previously indicated, the arrangements of magnetic recording systems and read channels, as described herein, provide a number of advantages relative to conventional arrangements. Again, it should be emphasized that the above-described embodiments of the invention are intended to be illustrative only. In general, the exemplary magnetic recording systems can be modified, as would be apparent to a person of ordinary skill in the art, to incorporate improved servo data detection using single bit error detection. In addition, the disclosed servo data detection techniques can be employed in any magnetic recording system. A number of exemplary single bit error detection techniques have been presented. Alternative single bit error detection mechanisms can be employed, as would be readily apparent to a person of ordinary skill in the art based on the disclosure herein.

While embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, application specific integrated circuit, micro-controller, or general-purpose computer. Such hardware and software may be embodied within circuits implemented within an integrated circuit.

In an integrated circuit embodiment of the invention, multiple integrated circuit dies are typically formed in a repeated pattern on a surface of a wafer. Each such die may include a device as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered part of this invention.

Thus, the functions of embodiments of the invention can be embodied in the form of methods and apparatuses for practicing those methods. One or more embodiments of the invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The embodiments can also be implemented in one or more of an integrated circuit, a digital signal processor, a microprocessor, and a micro-controller.

It is to be understood that the embodiments and variations shown and described herein are merely illustrative of the principles of this invention and that various modifications may be implemented by those skilled in the art without departing from the scope and spirit of the invention.

What is claimed is:

1. A pattern detection system, the system comprising:
    a first pattern detector circuit to apply a first pattern detection algorithm to:
        a first portion of a data input to yield a first detected pattern indicator; and
        a second portion of the data input to yield a second pattern indicator;
    a second pattern detector circuit to apply a second pattern detection algorithm to:
        the first portion of the data input using an adapted threshold to yield a first pattern value and a third detected pattern indicator;
        the second portion of the data input using the adapted threshold to yield a second pattern value and a fourth detected pattern indicator;
    a memory circuit to:
        store the first pattern value when at least one of the first detected pattern indicator or the third detected pattern indicator indicates a found pattern; and
        store the second pattern value when at least one of the second detected pattern indicator or the fourth detected pattern indicator indicates a found pattern.

2. The system of claim 1, the system further comprising: a threshold adaptation circuit to adapt the adapted threshold using the first pattern value from the memory circuit and the second pattern value from the memory circuit.

3. The system of claim 2, wherein threshold adaptation circuit is to: calculate a difference between the first pattern value and the second pattern value; multiply the difference by a gain to yield a product; and summing the product with the first pattern value to yield the adapted threshold.

4. The system of claim 3, wherein the gain is a value between zero and one.

5. The system of claim 3, wherein the gain is a configurable value.

6. The system of claim 3, wherein the first pattern value is a maximum identified Euclidean distance value, and second pattern value is a minimum identified Euclidean distance value.

7. The system of claim 1, wherein the first pattern detector circuit is a Hamming detector circuit, and wherein the first pattern detection algorithm is a Hamming distance determination algorithm.

8. The system of claim 7, wherein the Hamming distance determination algorithm includes: calculating a first Hamming distance between the first portion of the data input and a predefined pattern; calculating a second Hamming distance between the second portion of the data input and the predefined pattern; asserting the first detected pattern indicator when the first Hamming distance is less than a predefined threshold; and asserting the second detected pattern indicator when the second Hamming distance is less than the predefined threshold.

9. The system of claim 8, wherein the second pattern detector circuit is a Euclidean distance based detector circuit, wherein the first pattern value is a first Euclidean distance between the first portion and the predefined pattern, wherein the second pattern value is a second Euclidean distance between the second portion and the predefined pattern.

10. The system of claim 9, wherein the second pattern detection algorithm is a Euclidean distance determination algorithm that includes: calculating the first Euclidean distance between the first portion of the data input and the predefined pattern; calculating the second Euclidean distance between the second portion of the data input and the predefined pattern; asserting the third detected pattern indicator when the first Euclidean distance is less than the adapted threshold; and asserting the fourth detected pattern indicator when the second Euclidean distance is less than the adapted threshold.

11. The system of claim 1, wherein the second pattern detector circuit is a Euclidean distance based detector circuit, wherein the first pattern value is a first Euclidean distance between the first portion and the predefined pattern, wherein the second pattern value is a second Euclidean distance between the second portion and the predefined pattern, and wherein the second pattern detection algorithm is a Euclidean distance determination algorithm that includes: calculating the first Euclidean distance between the first portion of the data input and the predefined pattern; calculating the second Euclidean distance between the second portion of the data input and the predefined pattern; asserting the third detected pattern indicator when the first Euclidean distance is less than the adapted threshold; and asserting the fourth detected pattern indicator when the second Euclidean distance is less than the adapted threshold.

12. The system of claim 1, wherein the system is implemented in an integrated circuit.

13. The system of claim 1, wherein the predefined pattern is selected from a group consisting of: a servo address mark; a repeatable run out address mark; an image pattern; an antenna signal pattern; and a combination of a servo address mark and a repeatable run out address mark.

14. The system of claim 1, the system further comprising: a storage medium, wherein the data input is derived from the storage medium.

15. A method for pattern detection, the method comprising: applying a first pattern detection algorithm to a first portion of a data input to determine a first detected pattern indicator; applying the first pattern detection algorithm to a second portion of the data input to determine a second detected pattern indicator; using a pattern detector circuit applying a second pattern detection algorithm to: the first portion of the data input using an adapted threshold to yield a first pattern value and a third detected pattern indicator; and the second portion of the data input using the adapted threshold to yield a second pattern value and a fourth detected pattern indicator; and adapting the adapted threshold using: the first pattern value when at least one of the first detected pattern indicator or the third detected pattern indicator is asserted; and the second pattern value when at least one of the second detected pattern indicator or the fourth detected pattern indicator is asserted.

16. The method of claim 15, wherein the first pattern detection algorithm includes: calculating a first Hamming distance between the first portion of the data input and a predefined pattern; calculating a second Hamming distance between the second portion of the data input and the predefined pattern; asserting the first detected pattern indicator when the first Hamming distance is less than a predefined threshold; and asserting the second detected pattern indicator when the second Hamming distance is less than the predefined threshold.

17. The method of claim 16, wherein the pattern detector circuit is a Euclidean distance based detector circuit, wherein the first pattern value is a first Euclidean distance between the first portion and the predefined pattern, wherein the second pattern value is a second Euclidean distance between the second portion and the predefined pattern; and wherein the second pattern detection algorithm includes: calculating the first Euclidean distance between the first portion of the data input and the predefined pattern; calculating the second Euclidean distance between the second portion of the data input and the predefined pattern; asserting the third detected pattern indicator when the first Euclidean distance is less than the adapted threshold; and asserting the fourth detected pattern indicator when the second Euclidean distance is less than the adapted threshold.

18. The method of claim 15, wherein adapting the adapted threshold includes: calculating a difference between the first pattern value and the second pattern value; multiplying the difference by a gain to yield a product; and summing the product with the first pattern value to yield the adapted threshold.

19. The method of claim 18, wherein the gain is a value between zero and one.

20. The method of claim 19, wherein the first pattern value is a maximum identified Euclidean distance value, and second pattern value is a minimum identified Euclidean distance value.

21. The method of claim 20, the method further comprising: configuring the gain.

22. The method of claim 15, wherein the pattern detector circuit is a Euclidean distance based detector circuit, wherein the first pattern value is a first Euclidean distance between the first portion and the predefined pattern, wherein the second pattern value is a second Euclidean distance between the second portion and the predefined pattern, and wherein the second pattern detection algorithm is a Euclidean distance determination algorithm that includes: calculating the first Euclidean distance between the first portion of the data input and the predefined pattern; calculating the second Euclidean distance between the second portion of the data input and the predefined pattern; asserting the third detected pattern indicator when the first Euclidean distance is less than the adapted threshold; and asserting the fourth detected pattern indicator when the second Euclidean distance is less than the adapted.

* * * * *